FIGURE 1. U.V.L. ABSORPTION, TRICHODERMA TODICA ANTIBIOTIC
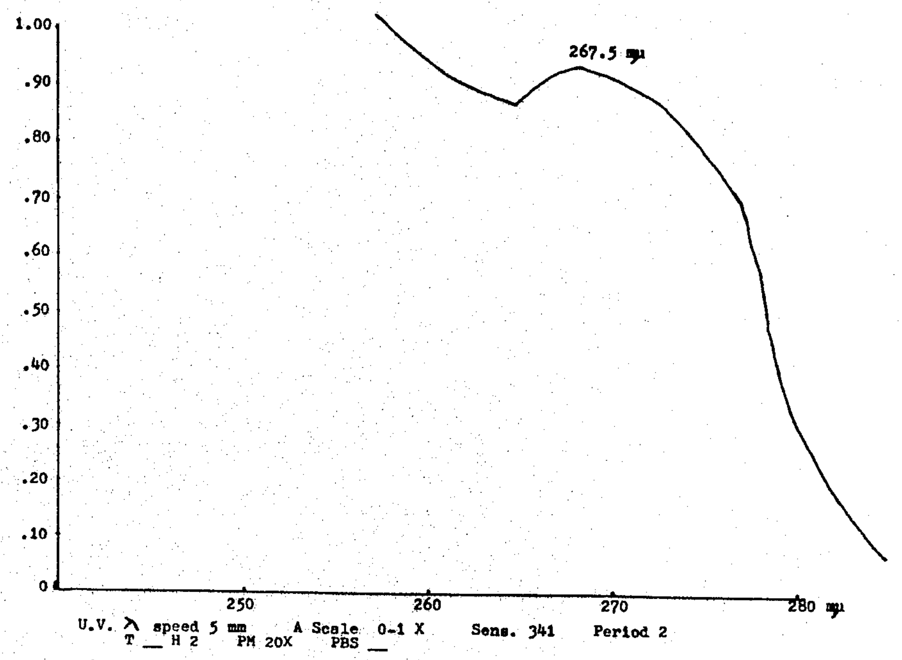
FIGURE 2
INFRARED ABSORPTION SPECTRA, TRICHODERMA TODICA ANTIBIOTIC
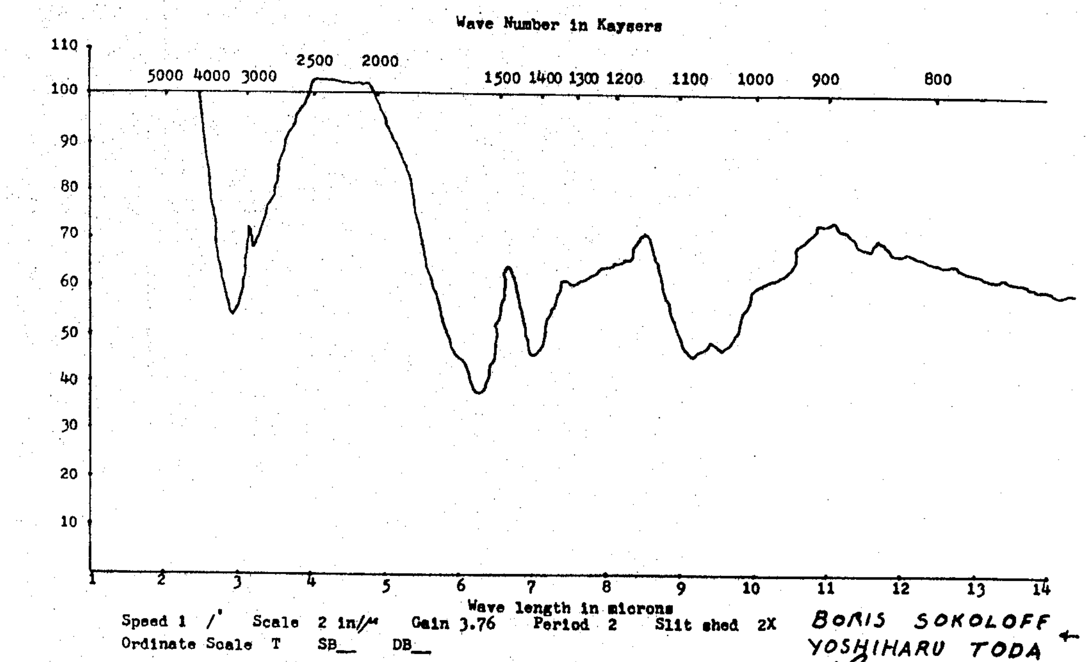
BORIS SOKOLOFF &
YOSHIHARU TODA
BY: Thomas S. Lobar [signature]
ATTORNEYS

FIGURE 3

INFRARED ABSORPTION SPECTRA, TRICHODERMA TODICA ANTIBIOTIC, HYDROLIZED BY HCl

Wave number in Kaysers

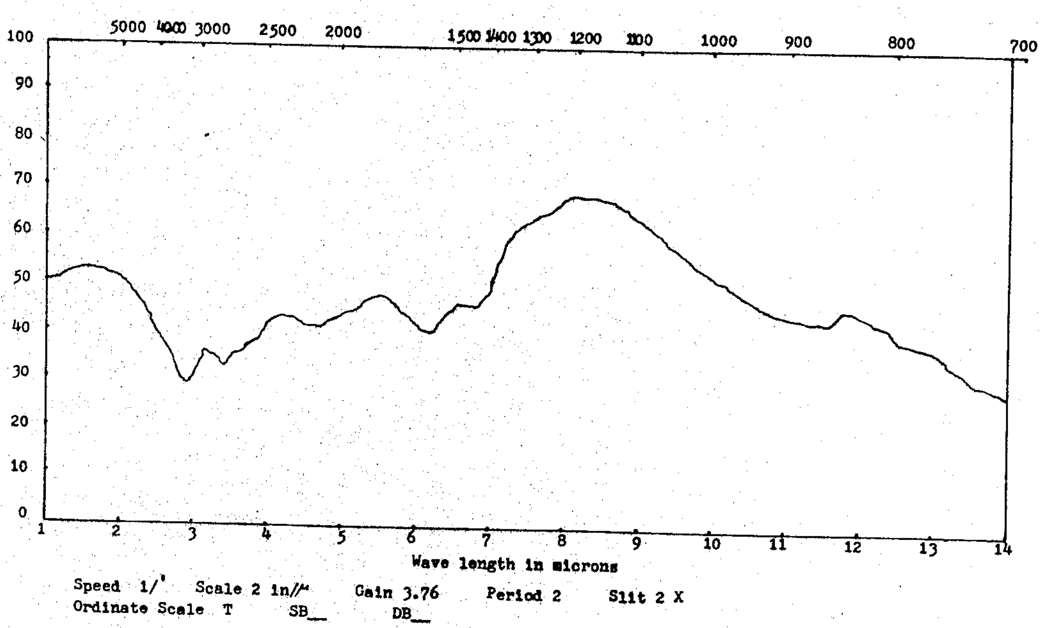

Speed 1' Scale 2 in/μ Gain 3.76 Period 2 Slit 2 X
Ordinate Scale T SB__ DB__

FIGURE 4

INFRARED ABSORPTION SPECTRA, TRICHODERMA TODICA ANTIBIOTIC

Wave Number in Kaysers

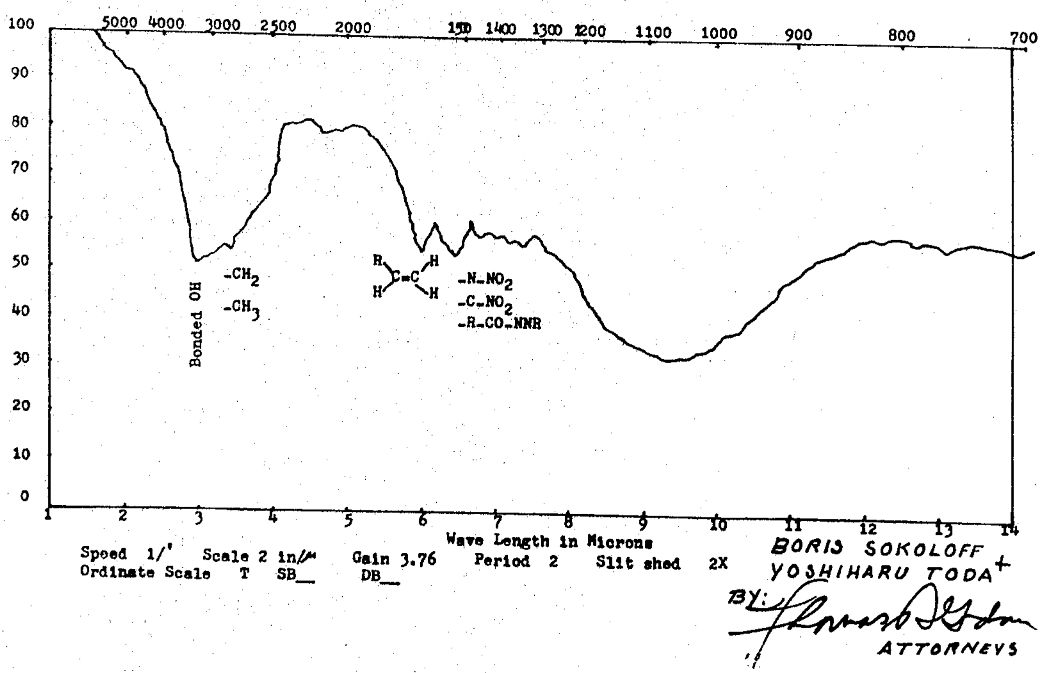

Speed 1' Scale 2 in/μ Gain 3.76 Period 2 Slit shed 2X
Ordinate Scale T SB__ DB__

BORIS SOKOLOFF
YOSHIHARU TODA
BY: [signature]
ATTORNEYS

Cellulose powder column developed by 50% ethanol for 8 hours.

| Fraction No. | Ninhydrin | Folin | Molisch |
|---|---|---|---|
| 9 | + | ++++ | - |
| 8 | - | +++ | - |
| 7 | - | ++ | - |
| 6 | - | + | - |
| 5 | ++ | - | - |
| 4 | ++ | - | - |
| 3 | +++ | ± | - |
| 2 | +++ | ± | - |
| 1 | +++ | + | - |

INVENTORS
BORIS SOKOLOFF
YOSHIHARU TODA
BY [signature]
ATTORNEYS

Developed by 50% ethanol for 20 hours

| Fraction No. | Ninhydrin | Molisch | Folin | Barium |
|---|---|---|---|---|
| 13 | ++++ | +++ | ++ | ++ |
| 12 | +++ | ++ | ++ | ++ |
| 11 | +++ | + | + | + |
| 10 | ++ | + | + | + |
| 9 | ++ | - | - | + |
| 8 | ± | - | - | + |
| 7 | ± | - | - | + |
| 6 | - | - | - | + |
| 5 | - | - | - | + |
| 4 | - | - | - | + |
| 3 | - | - | - | + |
| 2 | - | - | - | + |
| 1 | - | - | - | + |

INHIBITORY ACTIVITY OF TRICHODERMA TODICA ANTIBIOTIC
ON MOUSE SARCOMA 180

A. Control, not treated
B. Treated. Total dose: 24 mg./mouse

BORIS SOKOLOFF
YOSHIHARU TODA
BY: [signature]
ATTORNEYS

June 6, 1967 B. SOKOLOFF ETAL 3,323,996

ANTIVIRAL ANTIBIOTIC FROM TRICHODERMA TODICA
AND METHOD OF PRODUCING SAME

Filed Jan. 27, 1964 5 Sheets-Sheet 5

INHIBITORY ACTIVITY OF TRICHODERMA TODICA ANTIBIOTIC ON MOUSE EHRLICH CARCINOMA

A. Control: Not treated
B. Treated. Total dose 24.0 mg./mouse

INVENTORS
BORIS SOKOLOFF +
YOSHIHARU TODA
BY [signature]
ATTORNEYS

United States Patent Office 3,323,996
Patented June 6, 1967

1

3,323,996
ANTIVIRAL ANTIBIOTIC FROM *TRICHODERMA TODICA* AND METHOD OF PRODUCING SAME
Boris Sokoloff and Yoshiharu Toda, both of Florida Southern College, Lakeland, Fla. 32802
Filed Jan. 27, 1964, Ser. No. 340,459
3 Claims. (Cl. 167—65)

ABSTRACT OF THE DISCLOSURE

The invention may be summarized as a novel product and process for the production of the novel antiviral substances, which comprises under aerobic conditions, cultivating a culture of *Trichoderma todica* nov. sp. NRRL 3091 at a temperature of 15 to 40° C. in an aqueous nutrient medium containing sources of assimilable nitrogen and carbon, extracting mycelium and medium with acetone, precipitating active factors with $Ba(OH)_2$, extracting the precipitate with water, lyophilizing, extracting with a solvent, to leave a yellow-brownish powder residue of antiviral substances.

Figure 6:
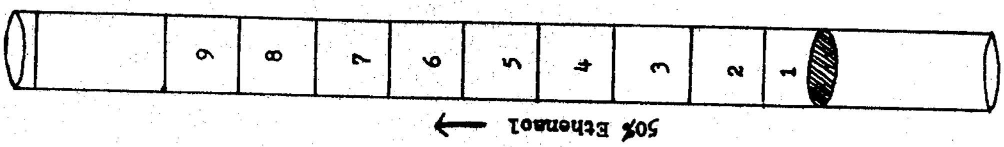

This invention relates to a new useful active antiviral antibiotic substance, isolated from a new species of the genus of Trichoderma, and to the method of its extraction and purification.

During the last fifteen years, numerous new antibiotics have been isolated and a number of them were found to be useful in the treatment of bacterial and fungal diseases, as well as in the inhibition of cancerous and other malignant growth. However, no active antiviral antibiotic of low cytotoxicity and of practical significance has been discovered as yet. In our search for such an antibiotic, we investigated numerous fungi, collected mostly in the Florida Everglades, by an improved method of endobiosis in chick embryos. This method consists in growing both the fungus and virus in chick embryos. If a virus destructive influence upon the embryo is prevented by a fungus, this indicates the possibility that such a fungus produces an antiviral substance. After having tested more than one hundred fungi, we came across two fungi which have shown a strong activity against influenza virus PR8 and influenza virus MF1 in embryonated eggs. The first fungi was identified as *Paecilomyces todicus,* nov. species and deposited with the Culture Collection Section, Fermentation Division, Southern Regional Research Laboratory, of the United States Department of Agriculture, and incorporated into the permanent culture collection of microorganisms as NRRL 2975. A patent application related to the discovery of this invention was submitted to the United States Patent Office, on Apr. 27, 1962, Ser. No. 219,614. The present specification relates to the second fungus isolated by us, *Trichoderma todica,* nov. sp.

After having isolated a crude antibiotic compound from the culture of *Trichoderma todica,* it was tested in vivo in mice infected with the viruses PR8 and MF1, and also against the transplanted mouse tumors: sarcoma 180 and Ehrlich carcinoma. The crude antibiotic showed a considerable inhibiting, actually oncolytic, activity against transplanted tumors. In view of the recent evidence indicating the casual role of viruses in some types of malignant growth, this unique property of the antibiotic suggests its potential usefulness, particularly so considering its low cytotoxicity.

Accordingly, it is a fundamental object of this invention to provide an antiviral, antitumor compound in useful form and a method of preparing it.

The genus Trichoderma contains only a few species. Upon comparing the biological, morphological and

2 chemical properties of other species of this genus, particularly *Trichoderma viride,* as described by Brian and Hemming, and Brian et al., and published in Annals Applied Biology, 32:1214–2220, 1945; 33:190–200, 1946; Nature (London), 156:144–45, 1945; and by Conant, Martin, Smith, Baker and Callaway: Manual of Clinical Mycology, Saunders, Philadelphia, 1944; it was established that the mold, discovered by us, is a new one and differs from any other known members of the genus Trichoderma. Accordingly, it was called *Trichoderma todica,* nov. species, and has been deposited with and is available from the Culture Collection Section, Fermentation Division, Southern Regional Research Laboratory, of the United States Department of Agriculture, and incorporated into the permanent culture collection of microorganisms as NRRL 3091.

The outstanding characteristics of the mold are: The colonies on modified Czapek-Dox solution agar grow moderately at room temperature, over 4.0 cm. in diameter in 12 to 14 days. The surface on slant agar is covered with whitely fine mycelia after 72 hours. Mycelia become thick, like white velvet, with branch formation at top. Mycelia get green coloration spot by spot. No extracellular pigmentation appearing within 14 days. Spore formation is completed after 20 days. The green coloration becomes darker to the dark green.

Conidia spores comparatively long, up to 200 to 300 microns in length by 40 to 45 microns. Conidial chains are produced in well defined columns up to 1.0 microns in length. Conidia is comparatively thick walled, smooth and globulace, mostly 4.0 to 4.5 microns in diameter.

The colonies on Czapek-Dox's modified solution agar with corn-steep water are larger than on Czapek-Dox only, growing much faster, with velvety appearance, heavier sporing, and a stronger conidial structure.

Colonies on Sabouraud's agar growing rapidly with the same appearance as above, over 6.0 cm. in diameter in 12 days, with the surface covered with white velvet after 2 days which becomes thick with fresh yellow extracellular pigmentation.

Colonies on malt extract agar and potato dextrose agar are very poor with thin screlotia, partially spotted green sporing and no pigmentation.

*Heat resistance of spores.*—About 100° C. for 15–20 minutes. The mold does not grow well on Barnes' media, brain-heart-infusion agar, malt agar, nutrient agar, potato dextrose agar. It offers good submerged growth in various liquid media tried here, within 3–4 days. Conidial spores and mycelia develop much more stronger and heavier.

Corn-steep water, caseine hydrolysate and peptone are counted as the growth promoting factors in case of stationary culture. On the other hand, corn-steep water, caseine-derivatives (casitone, tryptone, N - Z - amine-group), proteose-peptone, nutrient broth, soytone, yeast extract, rice-powder, protone, malt extract promote its growth in shake cultures. But the growth of it is increased remarkably by adding corn-steep water or caseine-hydrolysate to the synthetic media containing 30% of glucose.

*Optimal temperature for growth.*—About 21 to 27° C. but well grown at room temperature or over 30° C.

*Optimal pH for growth.*—5.0 to 7.0, but it grows well on very alkaline (pH 9.0 or more) media. On the other hand, the growth was inhibited in low acidic media (below pH 4.0).

*The sugar utilization.*—Arabinose, fructose, mannose, galactose, sorbitol, trehalose and milibiose are utilized well. Xylose, adenitol and dextrose are next to them, while innositol, mannitol, dulcitol, maltose, cellobiose, aesculin, soluble starch and glycerine are poorly utilized while rhamnose, sucrose, lactose, salicin, raffinose and inulin are not utilized at all by *Trichoderma todica.*

*Pigmentation.*—It gets yellow pigmentation extracellularly in various grades on Bennet's media, Conn's media, corn-steep media, mycological media, Sabouraud's media and Waksman's media modified. This pigmentation turns to a darker color.

The mycelia is colored usually white to green in various grades. The reverse of mycelia is generally light beige or brown. But both mycelia and reverse become a little darker after 10 days.

As for pigmentation, there is darker coloration in liquid growth. It is extremely variable depending on media.

*Essential amino acids for growth.*—Isoleucine, methianine and tyrosine are well utilized. Arginine, asparagine, glycin, phenylalanine, proline and valine were next active. Cystine, glutamic acid, leucine, serine and threonine are poorly utilized. Tryptophane is not utilized at all.

*Nitrogen utilization.*—Corn-steep water and caseine hydrolyzate were well utilized as the organic nitrogen source. As the anorganic nitrogen source, $NO_3$ and $NH_4$ were utilized but not $NO_2$. But $NO_4$ affects the pigmentation of the fungus, i.e. it makes it no coloration.

It grows best on media containing: dextrose, 30.0 g.; $K_2HPO_4$, 1.0 g.; $NaNO_3$, 3.0 g.; $MgSO_4$, 0.5 g.; KCl, 0.5 g.; $FeSO_4$, 0.01 g.; corn-steep water, 10.0 ml.; or caseine hydrolysate (N-Z-amine Type B, etc.); water 1000 1., pH 6.0 (adjusted pH with 10% $K_2HPO_4$).

This mold does not give any surface growth in the liquid culture. So that only the shake culture is available to produce antibiotics. There are considerable fluctuations in the pH during the fermentation period. In the case of the typical growth, with the initial pH of 6.0, it goes up gradually and gets close to neutral at 4th to 6th day. But change of pH was very variable in all cases. In many cases, the pH went down gradually from the starting and resumed it after 4 days (yeast extract), 5 days (rice powder, protone, malt extract), 6 days (N-Z-amine Type B), 7 days (soytone), 8 days (casitone) and 9 days (proteose-peptone, tryptone). In some cases it did not resume original pH (nutrient broth, adenine and Czapek-Dox dextrose liquid media).

Search for references related to the antibiotics produced by the genus Trichoderma revealed that only viridin was extensively investigated. (Brian, P. W. and H. S. Hemming, Gliotoxin, A Fungistatic Metabolic Product of Trichoderma Viride, Ann. Appl. Biol., 32 (3):214–220, 1945; Brian, P. W. and J. C. McGowan, Viridin: A Highly Fungistatic Substance Produced by *Trichoderma viride.* Nature, 156 (3953), 144–145, 1945; Brian, P. W., P. J. Curtis, H. G. Hemming & J. C. McGowan, The Production of Viridin by Pigment-Forming Strains of *Trichoderma viride,* Ann. Appl. Biol., 33(2):190–200, 1946; Laan, P. A. Van der., Antibiotische Stoffen als Fungicide Tegen *Cercospora Nicotianae* op Tabak (Antibiotics as Fungicides Against *C. Nicatianae* on Tobacco). Tijdochr. Plantenziekten., 58 (6): 180–187, 1947; Vischer, Howard & Raudnitz: Nature, 165:528, 1950; Vischer, E. B., S. R. Howland and H. Raudentz, Viridin, Nature, 165(4196):528, 1950; Wallen and Skolko, Canad. J. Bot., 29:316, 1951; Joseph P. LaRocca, John M. Leonard, and Warren E. Weaver, Organic fungicides, IV. Preparation and Fungicidal Activity of Some Amides of Chloral and $\alpha,\alpha,\beta$-trichlorobutyraldehyde. J. Org. Chem., 16, 47–50, 1951; Packchanian, Arozroony, Chemotherapy of Experimental Chagas Disease With Thirty Antibiotics. Amer. J. Trop. Med. & Hyg. 2(2):243-253, 1953; E. G. Jefferys, P. W. Brian, H. G. Hemming, and D. Lowe, Antibiotic Production by the Microfungi of Acid Heath Soils, J. Gen. Microbiol., 9, 314–41, 1953; W. B. McConnell, E. Y. Spencer, and J. A. Trew, Proteolytic Enzymes of Microorganisms. V. Extracellular Peptidases Produced by Fungi Grown in Submerged Culture, Can. J. Chem., 31, 697–700, 1953; Dahmen & Moutschen: Ann. Inst. Pasteur, Paris, 87:204, 1954; Joyce M. Wright, The Production of Antibiotics in Soil. I. Production of Gliotoxin by *Trichoderma virdie,* Ann. Appl. Biol., 41, 280–9, 1954; Yajima, J. Antibiot. Tokyo, Ser. A, 8:189, 1955; G. E. Blackman, M. H. Parke, and G. Garton, The Physiological Activity of Substituted Phenols, I. Relations Between Chemical Structure and Physiological Activity, Arch. Biochem. & Biophys., 54, 45–54, 1955; II. Relations Between Physical Properties and Physiological Activity, Ibid., 55–71; Nobuo Toyama, A Crystalline Enzyme from the Mold *Trichoderma koningi,* Miyazaki Daigaku Nogakubu Kenkyu Jiko 2, 79–81, 1957; Kyowa Fermentation Industry Co., Ltd., Citric Acid production by fermentation; Brit. 841, 420, 1960; Eugene L. Dulaney & Wm. J. McAleer, $\alpha$-Hydroxylation of Steroids by *Trichoderma viride,* U.S., 2,863,806, 1958; Nobuo Toyama, Cellulose Decomposition by *Trichoderma koningi,* X., Hakko Kogaku Zasshi 36, 348–54, 1958; W. Mary Crombie and P. E. Ballance, Synthesis of Long-Chain Fatty Acids From Acetate-2-$C^{14}$ and Glucose-$C^{14}$ in *Trichoderma viride,* Nature, 183, 1195–6, 1959; M. A. Gadzhieva, Effect of Fertilizers on the Growth and Type of Fungi on the Root Zone of Winter Wheat, Invest. Akad. Nauk Azerbaidzhan. S.S.R., Ser. Biol. i Sel' skokhoz. Nauk, No. 3, 111–16, 1959; Nobuo Toyama, Isolation and Properties of Cellulase from *Trichoderma koningi,* Mem. Fac. Agr. Univ. Miyazaki 2, 100–38; J. A. Winstead and R. J. Suhadolnik, Biosynthesis of *gliotoxin.* II. Further Studies on the Incorporation of $Carbon^{-14}$ and Tritium-Labeled Precursors, J. Am. Chem. Soc., 82, 1644–6, 1960; Nobuo Toyama, Nasaru Sase, and Masakazu Kawamoto, Softening of Chlorella Cell Wall by Cellulase, Miyazaki Daigaku Nogakubu Kenkyu Jiho, 6, 130–6, 1960; Pavel Nemec, Vladimir Betina, and Ludmila Kovacicova, Determination of Antibiotics from Fungi by Summarized Chromatography, Biologia (Bratislava) 16, 375–81, 1961; C. E. Holmlund, L. I. Feldman, N, E. Rigler, B. E. Nielson, and R. H. Evans, Jr., Microbiological Esterification of Steroids, J. Am. Chem. Soc., 83, 2586–7, 1961; and Margaret E. DiMenna, The Antibiotic Relations of Some Yeasts from Soil and Leaves, J. Gen. Microbiol. 27, 249–57, (1962).

The enzymic activity of *Trichoderma todica* was investigated. It was revealed that it contains fibrin coagulase and amylase. A lesser activity of catalase was detected, but no traces of activity of gelatinase, fibrinase, caseinase or milk-clotting enzyme were found. The data are presented in Table I.

TABLE I.—ENZYMATIC ACTIVITY OF *TRICHODERMA TODICA* CULTURE

[CDM medium, shake culture at 21° C.]

| Enzymes | Culture Broth | | |
|---|---|---|---|
| | 4 days old, pH 6.0 | 5 days old, pH 6.4 | 7 days old, pH 7.0 |
| Catalase | ± | ± | ± |
| Gelatinase | — | — | — |
| Casein digestion | — | — | — |
| Milk-clotting | — | — | — |
| Fibrin coagulation | 1 | 2 | 2 |
| Fibrinolysis | — | — | — |
| Amylase | 1 | 2 | 4 |

The numbers show units of activity. — no activity; ± moderate activity.

None of the antibiotics produced by the species of the Trichoderma genus so far known correspond in their biological activity to that of *Trichoderma todica.* As our tests described below have shown, the antibiotic produced by *Trichoderma todica* has no activity against any microorganisms, either bacteria or fungi, while the antibiotic, viridin, produced by other species of the genus of Trichoderma is active against some bacteria and particularly against fungi.

The mold we have isolated is aerobic. It grows well immersed in a nutrient medium but not on the surface. The culture broth contains mainly the active factor after a period of fermentation. The Czapek-Dox dextrose medium to which corn-steep water or hydrolyzated or enzyme-treated caseine was added served us for production of the antibiotic. On this liquid medium, the mold starts to grow after a few hours, with the submerged mycelia getting homogenized throughout the culture bottle. The optimal temperature 21 to 27° C. After growing for 3–4 days at the temperature of 22° C., the culture broth is filled with immersed homogenized mycelia. The color of mycelia is first whitish, then turns to brown (3 days later) so that the whole culture looks brown.

The antibiotic is extracted from a 3–4 day old submerged culture in shake. 35–60% acetone is added to the culture broth, after removing mycelia, is the most convenient method for the initial extraction of the active factor, although methanol or ethanol can be used also for this purpose.

The method of extraction is as follows: The culture broth is filtered. The active factor is precipitated with $Ba(OH)_2$. The acetone extraction of $Ba(OH)_2$-precipitate is reprecipitated with 90% acetone or ethanol. This precipitate is washed several times with 80% ethanol. Aluminum oxide or $ZnCl_2$ can be used instead of $Ba(OH)_2$, although it gives a lesser yield of initial precipitate. The material is dried under vacuum with phosphoric anhydride or deep freeze dried. The crude antibiotic so obtained is dark yellow-brownish powder, soluble in water, and diluted acetone or alcohols, and is not soluble in ether, chloroform, benzene, absolute ethanol and ethyl ether. The crude antibiotic is further purified through chromatography and with resins.

In summary the process is carried out at follows: under aerobic conditions, growing a culture of *Trichoderma todica* nov. sp. NRRL 3091, at a temperature of 15 to 40° C., in an aqueous nutrient medium containing sources of assimilable nitrogen and carbon, with corn maize added, extracting mycelium and medium with acetone, precipitating active factors with $Ba(OH)_2$, extracting the precipitate with water, lyophilizing, extracting with acetone, to leave a yellow-brownish powder residue of antiviral substances.

The chemical properties of *Trichoderma todica* were investigated.

The U.V.L. absorption, by furfural detection revealed a distinct peak at 267.5 as shown on FIGURE 1.

Infrared absorption spectra data are presented on FIGURES 2, 3 and 4. The FIGURE 2 curve correlates with the Orcinol-HCl reaction. FIGURE 3 presents the infrared absorption spectra after the antibiotic was hydrolyzed with 10% HCl in hot water bath for 10 minutes. The peak between 8 to 10 microns disappeared. The peaks at 2.9 and 3.4 and 6.1–6.3 and 6.7μ remain intact indicating the nucleus of the compound. FIGURE 4 shows a large depression of the peak between 9–10μ.

Figure 5:
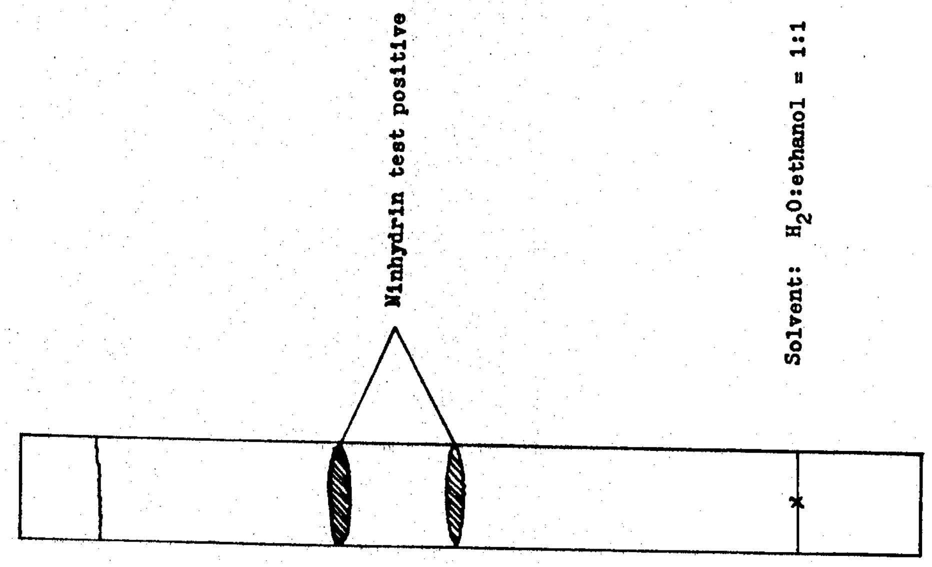

Chromatographic characteristics give some valuable information about the chemical structure. FIGURE 5 refers to the amino-acids at two positions.

Figure 7:
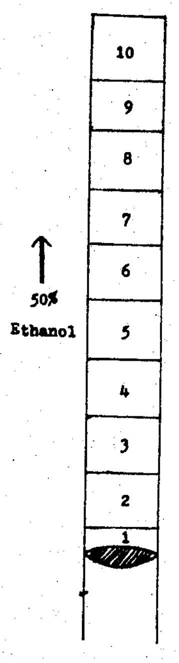

FIGURES 6 and 7 present the ninhydrin, Molisch and Folin reactions.

Tables II and III give additional data on these and other reactions.

TABLE II.—CHEMICAL PROPERTIES OF *TRICHODERMA TODICA* ANTIBIOTIC

| Sample No. | Molisch Reaction | | Phenol Reaction | | Orcinol Reaction | | Ehrlich Reaction | | $KMnO_4$ with Heat |
|---|---|---|---|---|---|---|---|---|---|
| | Violet or Red | Green | Millon | Folin | Pentose | Hexose | Room Temp. | Heat | |
| 10-9 | +++ | + | ± | +++ | S ++<br>R − | S +++<br>R + | − | + | + |
| 11-5 | +++ | + | ± | ++ | S ++<br>R − | S +++<br>R + | − | ± | + |
| 13-7 | +++ | + | ± | ++ | S ++<br>R − | S +++<br>R + | − | + | + |

TABLE III.—*TRICHODERMA TODICA* ANTIBIOTIC—CHEMICAL REACTIONS

| Batch No. | Molisch Reaction | Folin Reaction | Ninhydrin Reaction | $FeCl^3$ |
|---|---|---|---|---|
| 10-2 | +++ | +++ | +++ | − |
| 10-5 | +++ | ++ | +++ | − |
| 11-4 | +++ | +++ | +++ | − |

In order to demonstrate that the antibiotic differs from any other antibiotic, particularly those produced by the known species of Trichoderma, the factor was tested on bacteria and fungi. Five kinds of subcultures were prepared at 21° C. for 5 days in shake. Each sample of the antibiotic was obtained by regular standard procedure.

CDM (contained 1% corn-steep water)
CDC (contained 1% casitone)
CDP (contained 1% protone)
CDS (contained 1% soytone)
CDRP (contained 1% rice powder)

and extracted accordingly.

The following bacteria and fungi were tested: *Staphylococcus aureus, Escherichia coli, Pseudomonos aeruginosa, Sarcina lutea* and *Candida albicans,* by an indirect method (cylinder method). Brain-heart-infusion media and Sabouraud media (for *Candida albicans*) were used for growth. One percent solution of the crude antibiotic was applied for these tests.

The results presented on Table IV indicate that the antibiotic has neither antibacterial nor antifungal activity.

TABLE IV.—TEST ON THE ANTIBACTERIAL AND ANTIFUNGAL ACTIVITY OF THE ANTIBIOTIC PRODUCED BY *TRICHODERMA TODICA*

| Media of subculture | *Staphylococcus aureus* | *Escherichia coli* | *Pseudomonas aeru ginosa* | *Sarcina lutea* | *Candida albicans* |
|---|---|---|---|---|---|
| CDM | + | + | + | + | + |
| CDC | + | + | + | + | + |
| CDP | + | + | + | + | + |
| CDS | + | + | + | + | + |
| CDRP | + | + | + | + | + |

The activity of the antibiotic against viruses was tested first in embryonated eggs. Two viruses were tested: influenza A virus PR8 and influenza A virus MF1.

The strain of influenza virus was suspended in nutrient broth at pH 6.9–7.0, and diluted by the 10-fold dilution method. The antibiotic was dissolved in distilled water at ph 7.0 at the rate of 0.1 and 0.2 mg./0.1 ml. for testing. The virus suspension of each dilution was inoculated into the chorio-allantoic cavity of a ten-day-old chick embryo, and thereafter the antibiotic was injected into the same site of the egg and incubated for 24 hours.

After a 16-hour refrigeration, the chorio-allantoic fluids were pooled from each embryonated eggs and titrated by the modified Salk pattern test. Table V summarizes the results of testing various batches of the antibiotic.

TABLE V.—THE ACTIVITY OF THE ANTIBIOTIC FROM *TRICHODERMA TODICA* AGAINST INFLUENZA A VIRUS PR8 AND MFI IN EMBRYONATED EGGS

| Batches | Influenza virus PR8 doses | | Influenza virus MF doses | |
|---|---|---|---|---|
| | 0.1 mg. | 0.2 mg. | 0.1 mg. | 0.2 mg. |
| #E-10-16: | | | | |
| $ID_{50}$ Control | 8> | | | |
| $ID_{50}$ Treated | 6.4 | 6.1 | 6.6 | 6.3 |
| #E-10-17: | | | | |
| $ID_{50}$ Control | 8> | | | |
| $ID_{50}$ Treated | 6.3 | 5.9 | 6.5 | 6.2 |
| #E-10-18: | | | | |
| $ID_{50}$ Control | 8> | | | |
| $ID_{50}$ Treated | 6.1 | 5.8 | 6.3 | 6.1 |

In spite of some variations in the biological activity of the antibiotic against the two viruses, the variation often present in any biological testing, nevertheless, there is a definite, fully-pronounced activity against these viruses: the Control shows $ID_{50}$ about 8>, the treated eggs have $ID_{50}$ between 5.8 and 6.6.

The cytotoxicity of the antibiotic was thoroughly investigated since this property of any antibiotic is of major significance. The data presented on Table VI indicates that the cytotoxicity is low, and as it is demonstrated by use on mice, infected with virus (Table VII) or affected with malignant growth (Table VIII), there are little, if any, side effects when a therapeutically effective total dose is administered.

TABLE VI.—CYTOTOXICITY OF THE ANTIBIOTIC ISOLATED FROM *TRICHODERMA TODICA*

| Number of mice males, healthy | Orig. Avg. Body wt., gm. | Final Avg. After 8 days, gm. | Total dose given in seven days, mg. | Mortality Rate, Percent |
|---|---|---|---|---|
| 25 | 21.5 | 20.5 | 32.0 | None. |
| 25 | 21.8 | 24.2 | 24.0 | Do. |
| 25 (control) | 21.0 | 25.2 | | Do. |

Both total doses, 32.0 and 24.0 mg. given in eight days, peritoneally, are therapeutically effective. With the dose 32.0 mg. there was a slight loss in weight, 1.0 gm., 5% of body weight. With the total dose 24.0 mg. the animals gained body weight: average 2.4 gm.

Influenza A virus PR8 and MF1, adapted to mouse lung infection, was transferred, after several passages through mice, to the experimental group of mice. (Infected lung with influenza virus was removed, macerated with sand in Tyrode solution with penicillin, centrifuged and used for inoculation.) Sixteen hours after virus inoculation to experimental mice, the antibiotic was administered, intraperitoneally for five or six days in various total doses. On the fourteenth day after virus inoculation, each surviving mouse was killed and the lungs removed separately. The lungs were homogenated with sand, the pH adjusted to 7.0 with phosphate buffer, centrifuged at 2000 r.p.m. and the supernatant was used for titration, with 0.5% chick blood following the modified Salk pattern.

The results are presented in Table VII.

TABLE VII.—ACTIVITY OF THE ANTIBIOTIC FROM *TRICHODERMA TODICA* AGAINST INFLUENZA A VIRUS, PR8 AND MF1, IN MICE

| Virus | Total dose of antibiotic given in six days, twice a day, mg. | Mortality Rate, percent | Infectivity Rate, percent |
|---|---|---|---|
| Influenza A virus PR8: | | | |
| Control, avg. for 4 trials | | 97.5 | 100 |
| Treated, avg. for 3 trials | 12.0 | 33 3 | 50 |
| Treated, avg. for 3 trials | 18.0 | 15.0 | 15 |
| Influenza A virus MF1: | | | |
| Control, avg. for 3 trials | | 93 | 100 |
| Treated, avg. for 3 trials | 12.0 | 25.0 | 30 |
| Treated, avg. for 3 trials | 18.0 | 10.0 | 10 |

The data so presented indicate that while the control non-treated mice almost all died (97.5–98%) from viral pneumonia and all of them (100%) were infected, the antibiotic, in a total dose 18.0 mg. saved 85–90% of animals. All of them were free from infection. It was furthermore found that the mice so-cured, were immune to reinoculation of the same virus.

An opinion was expressed by some cancerologists that an antibiotic active against viruses would be active against malignant tumors. They cited the case of Mitomycin C, the most powerful antitumor factor ever discovered, which also exerted an antiviral activity. Unfortunately, Mitomycin C is very toxic and there is danger in using it in therapeutic doses on humans.

The antibiotic from *Trichoderma todica* exerts a strong oncolytic activity at the doses which produce no side effects on animals. The standard method was used for testing antitumor activity. Two transplanted mouse tumors served for these trials: sarcoma 180 and Ehrlich carcinoma. As a rule, 48 hours after tumor transplantation, the therapy was initiated with the antibiotic, administered twice a day, for eight consecutive days, with a total dose of 24.0 mg. On the ninth day, the tumors, both in the control and treated groups, were removed after the body weights of the animals were recorded. Table VIII summarizes the results of three series of tests, each with 20 mice control and 20 mice treated.

TABLE VIII.—INHIBITORY INFLUENCE OF *TRICHODERMA TODICA* ANTIBIOTIC ON TRANSPLANTED MOUSE TUMORS

| Tumor | No. Mice | Original Av. wt., gm. | Final Av. wt., gm. | Tumor wt., mg. | Inhibition, percent as compared with control |
|---|---|---|---|---|---|
| Sarcoma 180: | | | | | |
| Control, not treated | 60 | 21.8 | 24.2 | 4359 | |
| Treated, total dose 24 mg./mouse | 60 | 18.6 | 21.1 | 0686 | 84 |
| Ehrlich carcinoma: | | | | | |
| Control, not treated | 60 | 22.3 | 24.8 | 4297 | |
| Treated, total dose 24 mg./mouse | 60 | 20.8 | 21.2 | 0510 | 88.3 |

The tumor inhibition was considerably pronounced in both instances, with sarcoma 180 and Ehrlich carcinoma. In the first instance, the tumor was inhibited to the extent of 84% as compared with the control group. In the second case, the inhibition was slightly higher, but the body gain was smaller. The tumor was inhibited by 88.3%.

Figure 8:
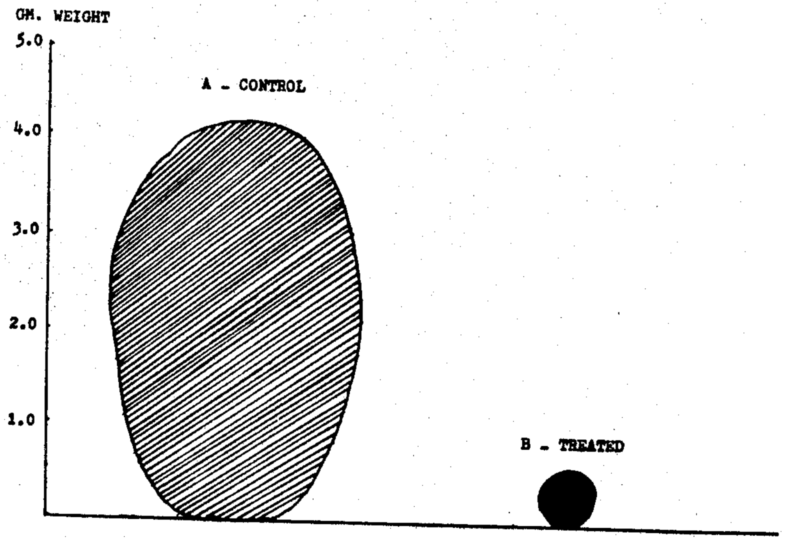
Figure 9:
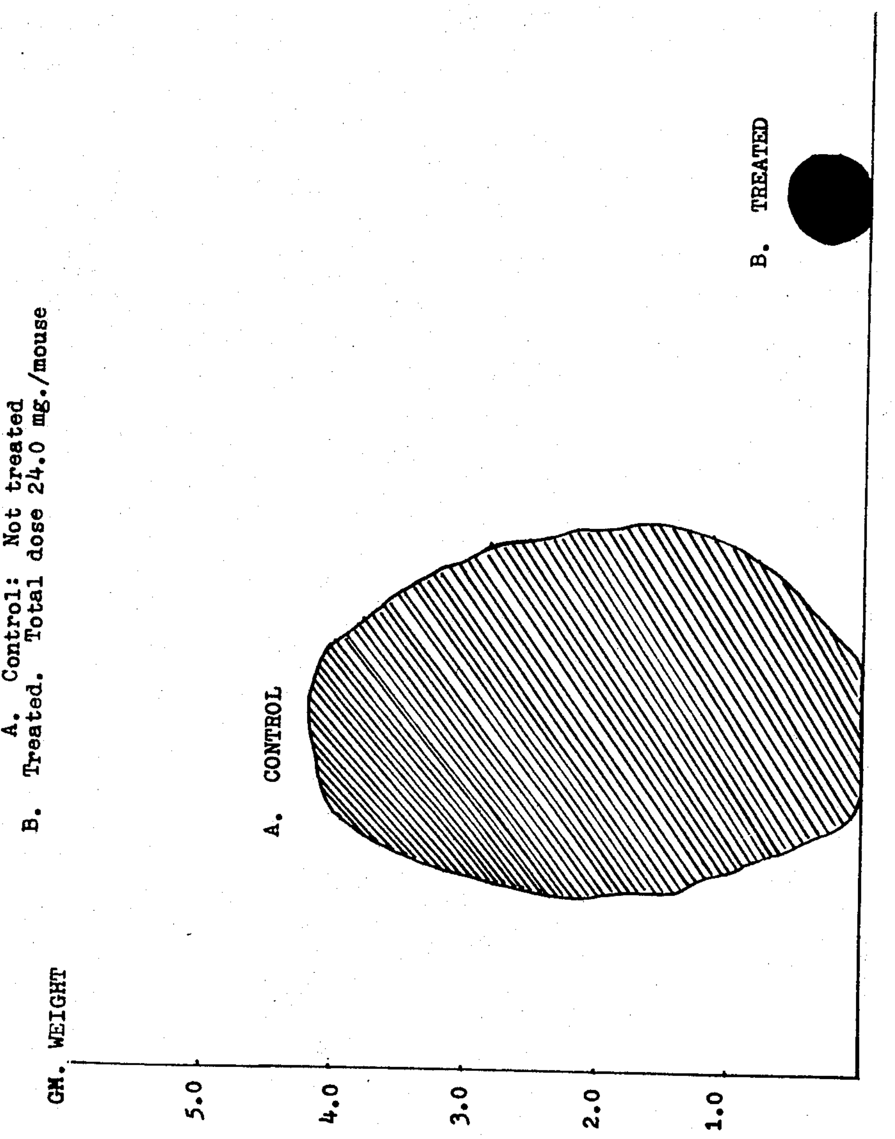

The actual weight of the control, not treated group, and the groups receiving the total dose of 24.0 mg. of the antibiotic are demonstrated on FIGURES 8 and 9. The black tumors are the treated ones. The lined tumors were not treated.

What is claimed is:

1. Antiviral substance comprising material extracted from the mycelium and medium on fermentation of culture of *Trichoderma todica*, nov. sp. NRRL 3091, in a nutrient medium said material being a yellow-brownish powder, water soluble, insoluble in absolute methanol, ethanol, acetone, benzene, chloroform, ethyl ether, with U.V.L. absorption by furfural detection, having a peak at 267.5λ, showing Orcinol-HCl reaction, with ninhydrin positive, Molisch negative, indicative of the position of two amino-acid groups, and showing a strongly pronounced antiviral activity both in vitro and in vivo against influenza A virus, being of low cytotoxity, said substance being the product of a process which comprises, under aerobic conditions, growing a culture of said *Trichoderma todica* nov. sp. NRRL 3091, at a temperature of 15 to 40° C., in an aqueous nutrient medium containing sources of assimilable nitrogen and carbon, with corn maize added, extracting mycelium and medium with acetone, precipitating active factors with $Ba(OH)_2$, extracting the precipitate with water, and lyophylizing it.

2. Process for the production of an antiviral substance, which comprises, under aerobic conditions, growing a culture of *Trichoderma todica* nov. sp. NRRL 3091 at a temperature of 15° to 40° C. in an aqueous nutrient medium containing sources of assimilable nitrogen and carbon, with casein hydrolysate added, extracting mycelium and medium with acetone, precipitating active factors with $Ba(OH)_2$, extracting the precipitate with water, lyophilizing the water extract, dissolving in aqueous acetone and precipitating with substantially absolute acetone and recovering the precipitate.

3. Process for the production of an antiviral substance, which comprises, under aerobic conditions, growing a culture of *Trichoderma todica* nov. sp. NRRL 3091 at a temperature of 15 to 40° C. in an aqueous nutrient medium containing sources of assimilable nitrogen and carbon, with casein hydrolysate added, extracting mycelium and medium with acetone, precipitating active factors with $Ba(OH)_2$, extracting the precipitate with 50% acetone, and lyophilizing it, thereby to produce a yellow-brownish powder, water soluble, insoluble in absolute methanol, ethanol, acetone, benzene chloroform, ethyl ether, with U.V.L. absorption by furfural detection, having a peak at 267.5λ, showing Orcinol-HCl reaction, with ninhydrin positive, Molisch negative, indicative of the position of two amino acid groups.

No references cited.

SAM ROSEN, *Primary Examiner.*